United States Patent
Gül et al.

(10) Patent No.: US 10,035,964 B2
(45) Date of Patent: Jul. 31, 2018

(54) CIRCULATING FLUIDIZED BED GASIFICATION OR COMBUSTION SYSTEM

(71) Applicant: TUBITAK, Ankara (TR)

(72) Inventors: Serhat Gül, Kocaeli (TR); Namik Ünlü, Kocaeli (TR); Emir Aydar, Kocaeli (TR); Haydar Livatyali, Kocaeli (TR); Tanju Nayir, Kocaeli (TR); Fehmi Akgün, Kocaeli (TR); Zeynep Sibel Özdogan, Istanbul (TR)

(73) Assignee: TUBITAK, Ankara (TR)

( * ) Notice: Subject to any disclaimer, the term of this patent is extended or adjusted under 35 U.S.C. 154(b) by 0 days.

(21) Appl. No.: 15/322,736

(22) PCT Filed: Jun. 27, 2015

(86) PCT No.: PCT/IB2015/054852
§ 371 (c)(1),
(2) Date: Dec. 29, 2016

(87) PCT Pub. No.: WO2016/001813
PCT Pub. Date: Jan. 7, 2016

(65) Prior Publication Data
US 2017/0130147 A1    May 11, 2017

(30) Foreign Application Priority Data
Jul. 4, 2014 (TR) .............. a 2014 07851

(51) Int. Cl.
C10J 3/48 (2006.01)
C10J 3/72 (2006.01)

(52) U.S. Cl.
CPC .......... *C10J 3/487* (2013.01); *C10J 3/723* (2013.01); *C10J 2200/152* (2013.01);
(Continued)

(58) Field of Classification Search
CPC combination set(s) only.
See application file for complete search history.

(56) References Cited

U.S. PATENT DOCUMENTS 3,301,905 A * 1/1967 Bander .................. B01J 27/06
                                                204/157.93
3,810,972 A * 5/1974 Humphrey et al. . B01D 53/508
                                                201/1

(Continued)

FOREIGN PATENT DOCUMENTS

CN        103285785 A     9/2013
GB         700511 A      12/1953
(Continued)

*Primary Examiner* — Kaity V Chandler
(74) *Attorney, Agent, or Firm* — Gokalp Bayramoglu

(57) ABSTRACT

The present invention is related to a circulating fluidized bed gasification or combustion system (1) using coal or biomass as raw material and comprising a combustion/gasification reactor (2); a cyclone (3) which is in connection with the reactor (2) so as to seperate solid particles from gas flow; a downcomer (4) which is in connection with the reactor (2) and the cyclone (3), extends along the reactor (2), and enables solid particles captured by the cyclone (3) to be sent to the combustion/gasification reactor (2) again; a distributing plate (5) which is in connection with the reactor (2) and provides primary gas supply to the system (1) homogeneously; at least one conduit which is positioned parallel to the downcomer (4); an ejector (7) which is positioned on the downcomer (4) vertically, comprises at least one nozzle (6) spraying pressurized gas towards the reactor (2).

4 Claims, 2 Drawing Sheets

(52) U.S. Cl.
CPC .. *C10J 2300/093* (2013.01); *C10J 2300/0916* (2013.01); *C10J 2300/1807* (2013.01)

(56) References Cited

U.S. PATENT DOCUMENTS

| | | | |
|---|---|---|---|
| 4,084,545 A | 4/1978 | Nack et al. | |
| 4,084,958 A * | 4/1978 | Collin | C21B 13/0033 |
| | | | 75/448 |
| 4,097,361 A * | 6/1978 | Ashworth | C10G 1/002 |
| | | | 208/127 |
| 4,416,913 A * | 11/1983 | Ingle | B01J 8/1854 |
| | | | 118/716 |
| 4,419,965 A | 12/1983 | Garcia-Mallol et al. | |
| 4,424,766 A * | 1/1984 | Boyle | F22B 31/0023 |
| | | | 110/245 |
| 4,552,203 A * | 11/1985 | Chrysostome | B01J 8/1809 |
| | | | 110/245 |
| 4,725,409 A * | 2/1988 | Wolf | B01J 8/0055 |
| | | | 422/145 |
| 4,730,563 A | 3/1988 | Thornblad | |
| 4,733,621 A * | 3/1988 | Kostamo | B01J 8/388 |
| | | | 110/245 |
| 4,882,400 A | 11/1989 | Dumain et al. | |
| 4,919,687 A * | 4/1990 | Lambertz | C10J 3/54 |
| | | | 422/111 |
| 4,929,255 A * | 5/1990 | Hakulin | C10J 3/54 |
| | | | 110/347 |
| 4,931,260 A * | 6/1990 | Molerus | B01J 8/388 |
| | | | 34/591 |
| 5,382,638 A * | 1/1995 | Bontemps | B01J 8/003 |
| | | | 422/144 |
| 5,792,340 A * | 8/1998 | Freel | C10B 49/20 |
| | | | 201/12 |
| 6,269,778 B1 | 8/2001 | Anderson et al. | |
| 8,198,384 B1 * | 6/2012 | Moore | B01J 8/0015 |
| | | | 422/139 |
| 9,073,027 B2 * | 7/2015 | Soffritti | B01J 8/0055 |
| 2007/0040056 A1 * | 2/2007 | Weidhaus | B02C 19/068 |
| | | | 241/39 |
| 2009/0269260 A1 | 10/2009 | Liu | |
| 2010/0150788 A1 * | 6/2010 | Palmas | B01J 8/0055 |
| | | | 422/144 |
| 2010/0163465 A1 * | 7/2010 | Bligh | B01J 8/0025 |
| | | | 209/154 |
| 2010/0190935 A1 | 7/2010 | Scott et al. | |
| 2010/0190953 A1 | 7/2010 | Fuji et al. | |
| 2012/0055089 A1 * | 3/2012 | Kavanaugh | C10J 3/487 |
| | | | 48/89 |
| 2012/0111109 A1 * | 5/2012 | Chandran | B01J 8/0055 |
| | | | 73/32 R |
| 2013/0143167 A1 * | 6/2013 | Proell | B01J 8/0055 |
| | | | 431/7 |
| 2015/0232588 A1 * | 8/2015 | Balestra | C08F 10/06 |
| | | | 526/128 |

FOREIGN PATENT DOCUMENTS

| | | |
|---|---|---|
| GB | 1291343 A | 10/1972 |
| JP | S62190309 A | 8/1987 |
| JP | H10148468 A | 6/1998 |
| JP | 2003038948 A | 2/2003 |
| RU | 2202069 C1 | 4/2003 |

* cited by examiner

CIRCULATING FLUIDIZED BED GASIFICATION OR COMBUSTION SYSTEM

CROSS REFERENCE TO RELATED APPLICATIONS

This application is the national phase entry of International Application No. PCT/IB2015/054852, filed on Jun. 27, 2015, which is based upon and claims priority to Turkish Patent Application No. 2014/07851 filed on Jul. 4, 2014, the entire contents of which are incorporated herein by reference.

TECHNICAL FIELD

The present invention is related to a circulating fluidized bed gasification or combustion system.

BACKGROUND

In circulating fluidized bed combustion/gasification systems which utilize coal and biomass as raw material, the bed material (inert ash/sand) inside the reactor is required to be recycled after it rises through the reactor and is captured by the cyclone. Solid circulation inside the conventional systems may not be stable while the said process is being carried out, because the fluidized bed pressure barrier (loop seal) may lose its function upon being affected by pressure fluctuations inside the reactor. When the loop seal loses its function, the bed material inside the loop seal escapes from the cyclone and thus the pressure barrier between the downcomer and the reactor is broken. In this case, it is necessary to shut down and restart the system in order to recharge the system with new bed material.

In circulating fluidized bed systems, it is necessary to prevent the reverse flow of gases from reactor to the downcomer, in order to get stable solid circulation. Pressure barrier is usually provided in order to prevent reverse gas flow, which can be fluidised bed or static sand/ash column. Besides, in conventional circulating systems, 6-9% and 12-18% of total primary air is supplied to the loop seal to fluidize the pressure barrier bed material in combustion and gasification systems, respectively. Air provided from thereof is supplied with more pressure than the primary air and therefore efficiency of system decreases.

The Great Britain patent document no. GB 1291343, an application in the state of the art, discloses a solid fuel combustion system wherein pulverized coal is burned in combustion chamber with fluidized bed. Fly ash and burnt gases are fed to the cyclone separator mounted outside the combustion chamber and fed to the fluidized bed region again by means of the conduit, wherein the ejector is placed on unburnt particles, which are separated in the cyclone. Thus, the ejector prevents blockage of the conduit or malfunctions due to increase of pressure in the fluidized bed region.

The Japanese patent document no. JP62190309, an application in the state of the art, discloses a combustion system with bubbling fluidized bed. In the system disclosed in the said document, gases, which occur after combustion reactions taking place in the combustion region with fluidized bed, can contain some particles. The gas moving to the upper regions of the reactor together with the particles is dragged to the second combustion region of the reactor together with the mixture of air fed from the ejector and the fine particles kept in the cyclone. By means of the ejector system operating as an air curtain, retention ratio of the particles, which are being dragged upwards, increases inside the reactor and the amount of the particles reaching the cyclone decreases.

The United States patent document no. U.S. Pat. No. 4,730,563, an application in the state of the art, discloses a fluidized bed combustion system. In the said system, the gases occurring in the combustion region with fluidized bed move to the upper regions of the reactor together with the particles. The aim is that the centrifugal particle separator placed in the outlet region of the reactor primarily captures coarse particles. Particles separated by the particle separator are sent to bottom region of the fluidized bed by means of a conduit. In the outlet region of this conduit, ejector is used in order to overcome the counter pressure in the bed region. Combustion air pressurized by compressor is used as propellant gas in the ejector.

The United States patent document no. U.S. Pat. No. 4,882,400, an application in the state of the art, discloses a polymerization system with fluidized bed. In the said system, particles leaving the fluidized bed region together with the carrier gas are separated from the gas to a large extent by means of cyclone separator. Particles separated in the cyclone region enter the reactor again, just over the fluidized bed region, by means of the ejector. Pressurized carrier gas is used as propellant gas in the ejector.

The Japanese patent document no. JP10148468, an application in the state of the art, discloses a drying system with a circulating fluidized bed. In the said system, the mixture of intense particles and drying gas in the drying region with fluidized bed is separated from each other to a large extent by means of cyclone separator. Particles separated in the cyclone region are collected in the particle storage tank. Particles collected in the tank enter the drying system with fluidized bed again by means of ejector.

The United States patent document no. U.S. Pat. No. 6,269,778, an application in the state of the art, discloses a combustion system with circulating fluidized bed wherein circulation efficiency of fine particles is enhanced. In the said system, a part of fine particles escaping from the cyclone in conventional systems with loop seals, is captured.

The Japanese patent document no. JP2003038948, an application in the state of the art, discloses a particle processing system with bubbling fluidized bed. In the said system, a large part of the particles reaches the return conduit by separating off from the gas flow while passing through the spiral-shaped conduits before the reactor exit. The particles, which are separated by the spiral separator are sent to the bed region again by means of ejector system placed onto the return conduit in order to overcome the counter pressure in the bed region.

The United States patent document no. US2010190935, an application in the state of the art, discloses a polymerization system with fluidized bed. The said system overcomes the problem of blocking, which is experienced in current systems used for sending the fine particles into the reactor again, after they are captured in the cyclone. In order to overcome this problem, vertically oriented ejector is used instead of horizontally oriented ejector used in conventional systems. The propellant gas flow direction, the mixture of particle/gas flow direction and the outflow direction are same.

The Russian patent document no. RU2202069, an application in the state of the art, discloses a system and method for burning solid fuels. In the method disclosed in the said document, thermal decomposition process is performed in two stages, At the first stage, heating and partial thermal decomposition take place outside the fluidized bed. At the second stage, a vortex is created inside the fluidized bed and by means of the vortex created, the solid is separated from its ashes and burnt. In the said system, the ejector is connected to an air supply source.

The Chinese patent document no. CN103285785, an application in the state of the art, discloses a spouted fluidized bed reactor and a polymer preparation method. The system disclosed in the said document comprises a cyclone separator which is connected with a straight cylinder section and a liquid ejector. In the method disclosed in the said document, the gas sprayed from the ejector and the auxiliary gas are distributed equally and it is ensured that there is no aggregation in the reactor.

SUMMARY

An objective of the present invention is to realize a circulating fluidized bed gasification or combustion system.

Another objective of the present invention is to realize a circulating fluidized bed gasification or combustion system wherein resistance is provided against downward movement of solid particles by means of severe vortexes generated in downcomer.

Another objective of the present invention is to realize a circulating fluidized bed gasification or combustion system wherein flow-rate of solid flow can be controlled.

Another objective of the present invention is to realize a circulating fluidized bed gasification or combustion system wherein vertical motion of the gas sprayed from the ejector and the solid column generated are parallel to one another.

Figure 1:
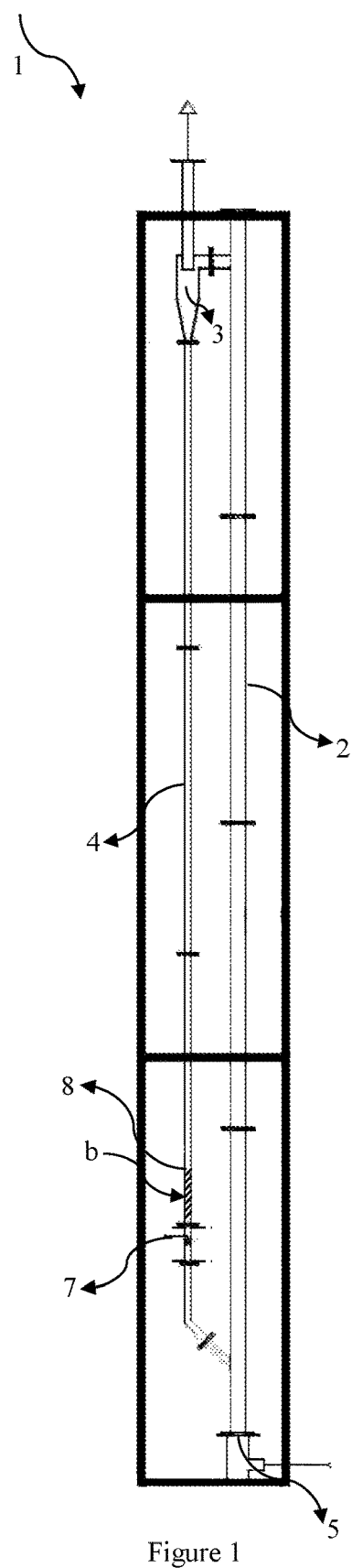
FIG. 1 is a front view of the inventive system.
Figure 2:
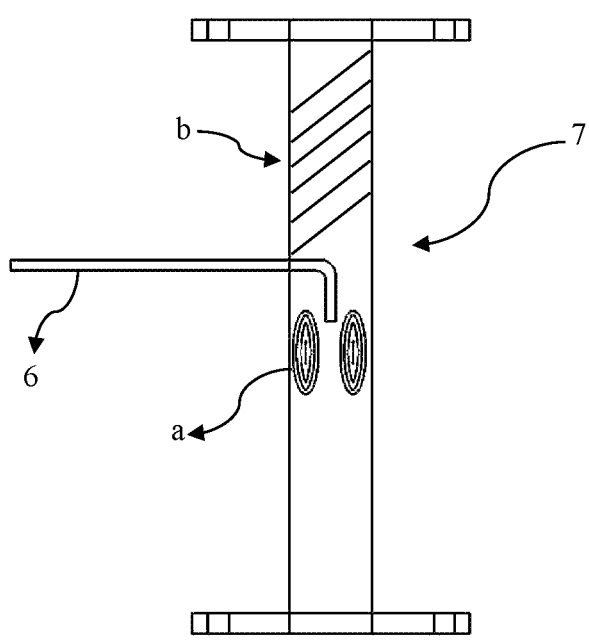
FIG. 2 is a view of the ejector included by the inventive system.

The components illustrated in the figures are individually numbered, where the numbers refer to the following:
1. L System
2. Reactor
3. Cyclone
4. Downcomer
5. Distributing. plate
6. Nozzle
7. Ejector
8. Solid Level Meter
a. Vortex
b. Solid Column.

DETAILED DESCRIPTION

"Circulating fluidized bed gasification or combustion system" realized to fulfill the objectives of the present invention is shown in the figures attached.

The inventive circulating fluidized bed gasification or combustion system (1) comprises: at least one combustion/gasification reactor (2); at least one cyclone (3) which is in connection with the reactor (2) so that solid particles such as coal biomass are separated from gas flow; at least one downcomer (4) which is in connection with the reactor (2) and the cyclone (3), extends along the reactor (2), and enables solid particles captured in the cyclone (3) to be sent to the combustion/gasification reactor (2) again; at least one distributing plate (5) which is in connection with the reactor and performs primary gas supply to the reactor (2) homogeneously; at least one conduit (not shown in the figures) which is positioned parallel to the downcomer (4); at least one ejector (7) which is positioned within the downcomer (4) vertically having at least one nozzle (6), wherein the nozzle (6) includes a tip positioned parallel to the downcomer (4), the tip spraying pressurized gas towards the reactor (2), and creates a solid column (b) between the reactor (2) and the cyclone (3) by creating vortexes (a) on account of the fact that the pressurized gas sprayed by means of the said nozzle (6) tip spreads to the environment from the nozzle (6) tip located within the downcomer (4) in order to prevent counter flow of particle and gas that may occur towards the downcomer (4) and the cyclone (3) from inside the reactor (2).

In the inventive system (1), as supply is provided into the reactor (2) homogeneously by means of the distributing plate (5) which is in connection with the reactor (2). Solid circulation is provided in the system (1) by the ejector (7) which is vertically positioned in the downcomer (4). The ejector (7) is used to create vortexes (a) on the upper part of the ejector (7) by enabling the pressurized gas flow towards the reactor (2) at high speeds from the nozzle (6) tip, which tip is positioned parallel to the downcomer (4). Flow-rate of solid flow, which is downwards, in other words towards the reactor (2), is controlled by means of the vortexes (a) created by the ejector (7). When the flow-rate of the gas exiting the ejector (7) is increased, intensity of the vortex (a) increases and thus resistance against solid flow increases, whereas resistance against solid flow reduces by decrease of intensity of the vortex (a) when the flow-rate of the gas is reduced. Therefore, control of solid flow-rate is ensured by increasing/decreasing flow-rate of the gas sprayed from the ejector (7). Resistance increases as the intensity of the vortex (a) created is increased and the solid column (b) occurs on the upper part of the ejector (7) when a certain resistance level is reached. Discharge of the solid column (b) downwards is prevented by the vortexes (a) created by the high-speed gas sprayed from the ejector (7). Thus, solid flow is provided towards the reactor (2) at desired level. By this means, the solid flow-rate received from the cyclone (3) and the solid flow-rate sent downwards from the vortex (a) region become equal and thus the height of the solid column (.sub.h) remains fixed.

In the inventive system (1), pressurized gas, air, superheated steam, nitrogen, carbon dioxide gas or any inert gas can be used as propellant fluid.

The system (1) disclosed in an embodiment of the invention comprises at least one solid level meter switch (8) which measures the level of the solid column (b) accumulated on the upper part of the ejector (7) by means of the vortexes (a) created by the ejector (7). Thus, differences of solid flow-rate resulting from fluctuations that may occur during the process are compensated.

In the system (1) developed by the present invention, solid particles sent to the reactor (2) pass through a severe turbulence due to the Vortexes (a) created through the ejector (7); and agglomeration problem, which is frequently experienced in fluidized bed systems, is reduced by means of this severe turbulence. Additionally, gas flow towards the cyclone (3) is stopped by means of the solid column (b) generated on the upper part of the ejector (7) by means of the vortexes (a) and the high-speed gas sprayed towards the reactor (2) from the ejector (7). Therefore, efficiency of the cyclone (3) is enhanced. By means of the system (1) developed by the present invention, a pressure barrier is generated without using systems with static (L valve, etc.) or fluidized bed (loop seal, etc) which are used to provide circulation loop of solid material in system with circulating fluidized bed.

Within these basic concepts, it is possible to develop various embodiments of the inventive "Circulating Fluidized Bed Gasification or Combustion System". The invention is not limited by the examples disclosed herein and covers the entire scope as defined by claims.

The invention claimed is:

1. A system of circulating fluidized bed gasification or combustion using coal or biomass as raw material, comprising:
    at least one combustion/gasification reactor;
    at least one cyclone which is in connection with the combustion/gasification reactor in order that a plurality of solid particles are separated from a gas flow;
    a downcomer which is in connection with the combustion/gasification reactor and the cyclone, extends along the combustion/gasification reactor, and enables the plurality of solid particles captured in the cyclone to be sent to the combustion/gasification reactor again;
    at least one distributing plate which is in connection with the combustion/gasification reactor and performs primary gas supply to the system homogeneously;
    wherein
    at least one ejector is vertically positioned at a lower part of the downcomer and is disposed within the downcomer;
    the ejector comprises at least one nozzle, wherein the nozzle comprises a tip positioned parallel to the downcomer, such that the nozzle tip sprays a pressurized gas towards the combustion/gasification reactor, and creates a solid column between the nozzle and the cyclone by creating vortexes on account of the fact that the pressurized gas sprayed by the nozzle tip spreads to the environment from the nozzle tip located within the downcomer in order to prevent a counter flow of the plurality of solid particles and the gas flow that occur towards the downcomer and the cyclone from inside the combustion/gasification reactor;
    wherein a downward flow rate of the plurality of solid particles from the cyclone towards the combustion/gasification reactor is controlled by means of the vortexes by controlling a flow rate of the pressurized gas sprayed from the ejector.

2. The system of circulating fluidized bed gasification or combustion system according to claim 1, wherein the pressurized gas is selected from the group consisting of superheated steam, nitrogen, carbon dioxide gas and inert gases.

3. The system of circulating fluidized bed gasification or combustion system according to claim 1, further comprising at least one solid level meter/switch which measures a level of the solid column accumulating on an upper part of the ejector.

4. The system of circulating fluidized bed gasification or combustion system according to claim 2, further comprising at least one solid level meter/switch which measures a level of the solid column accumulating on an upper part of the ejector.

* * * * *